United States Patent
Shiratori et al.

(10) Patent No.: US 6,454,915 B1
(45) Date of Patent: *wx.–99,–9999

(54) INFORMATION RECORDING MEDIUM AND METHOD FOR PRODUCING THE SAME

(75) Inventors: Tsutomu Shiratori, Tokyo; Kazuoki Hongu, Yokohama, both of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/693,877

(22) Filed: Oct. 23, 2000

Related U.S. Application Data

(62) Division of application No. 09/016,323, filed on Jan. 30, 1998, now Pat. No. 6,180,208.

(30) Foreign Application Priority Data

Jan. 31, 1997 (JP) .............................................. 9-018341
Jan. 9, 1998 (JP) ............................................. 10-003379

(51) Int. Cl.⁷ ......................... C23C 14/34; C23C 16/00; B44C 1/22
(52) U.S. Cl. .............................. 204/192.2; 204/192.32; 204/192.35; 427/130; 216/22
(58) Field of Search ....................... 204/192.2, 192.32, 204/192.35; 427/128, 129, 130, 131; 216/22

(56) References Cited

U.S. PATENT DOCUMENTS

| | | | |
|---|---|---|---|
| 4,390,600 A | | 6/1983 | Ohta ........................... 478/621 |
| 4,893,299 A | * | 1/1990 | Humberstone et al. .. 369/275.4 |
| 4,911,967 A | * | 3/1990 | Lazarri ....................... 428/65.6 |
| 5,199,024 A | * | 3/1993 | Taki et al. ............. 428/694 TP |
| 5,418,076 A | * | 5/1995 | Shiratori ...................... 369/13 |
| 5,428,586 A | * | 6/1995 | Kobayashi et al. ........... 360/59 |
| 5,576,918 A | * | 11/1996 | Bar-Gadda ................... 360/135 |
| 5,580,639 A | * | 12/1996 | Togawa ....................... 428/156 |
| 5,626,941 A | | 5/1997 | Ouano ......................... 428/141 |
| 5,629,909 A | | 5/1997 | Shiratori ....................... 369/13 |
| 5,648,134 A | | 7/1997 | Shiratori et al. ............. 428/641 |
| 5,811,182 A | | 9/1998 | Weir ........................... 428/336 |
| 5,846,626 A | | 12/1998 | Kashiwagi ................. 428/64.1 |
| 5,914,168 A | | 6/1999 | Wokamatsu ................ 428/65.3 |
| 5,936,915 A | | 8/1999 | Fujii et al. ..................... 369/13 |
| 5,949,743 A | | 9/1999 | Shiratori ....................... 369/13 |
| 5,956,296 A | | 9/1999 | Yamamoto et al. ........... 369/13 |
| 5,962,154 A | | 10/1999 | Hashimoto et al. ......... 428/694 |
| 5,966,348 A | | 10/1999 | Hashimoto et al. ........... 369/13 |
| 6,027,825 A | | 2/2000 | Shiratori et al. ............. 428/695 |
| 6,084,830 A | | 7/2000 | Ashinuma et al. ............ 369/13 |
| 6,177,175 B1 | * | 1/2001 | Hashimoto ................... 428/141 |
| 6,180,208 B1 | * | 1/2001 | Shiratori et al. ......... 204/192.2 |

FOREIGN PATENT DOCUMENTS

| | | | |
|---|---|---|---|
| JP | 01 224 952 A | * | 9/1989 |
| JP | 2-240845 | | 9/1990 |
| JP | 6-034907 | | 2/1994 |
| JP | 6-290496 | | 10/1994 |
| JP | 07 334 869 A | * | 12/1995 |
| JP | 9-161321 | | 6/1997 |

* cited by examiner

*Primary Examiner*—Rodney G. McDonald
*Assistant Examiner*—Gregg Cantelmo
(74) *Attorney, Agent, or Firm*—Fitzpatrick, Cella, Harper & Scinto

(57) ABSTRACT

In a method of producing an information recording medium, any recording film is not substantially formed on the slope portions of a substrate in which slope portions having surfaces non-parallel to the surface of the information track of an information recording medium are provided on the opposite sides of the information track. A recording film of a predetermined film thickness is formed on the information track.

2 Claims, 12 Drawing Sheets

INFORMATION RECORDING MEDIUM AND METHOD FOR PRODUCING THE SAME

This application is a division of application Ser. No. 09/016,323, filed Jan. 30, 1998, now issued as U.S. Pat. No. 6,180,208.

BACKGROUND OF THE INVENTION

1. Field of the Invention

This invention relates to a method of producing an information recording medium, and an information recording medium produced by the method.

2. Related Background Art

Various optical recording media and magnetic recording media are known as information recording media comprising a substrate and recording film formed thereon. An optical recording medium for recording information thereon correspondingly to a change in an optical state detectable by light permits higher density and has been put into practical use as an optical disc or an optical card. Changes in an optical state formed on the optical recording medium include recess and projection bits, the presence or absence and deformation of reflecting film, changes in refractive index, reversal of magnetization, etc. Among these, reversal of magnetization is detected as a change in the polarized state of reflected light, and another form, it is detected as a change in the quantity of reflected light.

Also, in the case of such an optical detection system, a mechanism of tracking and focusing is adopted to direct light to a predetermined place during recording and reproduction. As an element constituting the setup thereof, a groove called a guide groove is usually formed on the medium. This groove is usually not used for recording. However, in recent years, in order to make the density higher, it has been proposed to record on this groove (called the land/groove recording system) as well, as is disclosed in Japanese Laid-Open Patent Application No. 6-34907.

In this case, the bottom surface of the groove is a flat surface parallel to a land surface and a substrate surface. The groove refers to a portion which is recessionary as viewed from a side on which information tracks are formed. In order to achieve still higher density, it is conceivable to make the track pitch small and achieve narrow tracks, and in that case, as a contrivance for not destroying the data of adjacent tracks, it has been proposed to make the level difference between a land portion and a groove portion, i.e., the depth of the groove, great, as is disclosed in Japanese Laid-Open Patent Application No. 9-161321.

In a recording mode for inducing such a change in the optical state by the application of a laser beam for heating, the size and shape of a state change area (recording mark) formed are determined by a temperature distribution induced on the recording film by localized heating. The temperature distribution induced on the recording film is affected by heat diffusion in the direction of the film surface. Therefore, even when the amount of incident heat per unit time is made constant and a heating area is moved at a constant linear velocity, the temperature distribution formed changes in a complicated manner, depending on the movement distance or the distance from a heated area.

Therefore, when a heating operation simply corresponding to information is performed, the width of a mark formed by an information pattern fluctuates. If such a mark train is time-serially read out by the scanning of a light beam, the timing jitter of mark detection increases and so, there is the risk that the original information cannot be properly reproduced.

To avoid this problem, various recording compensation systems for adjusting the amount of incident heat per unit time or the heating time or the like in conformity with the information pattern have been proposed. But, in this case, there is the problem that recording means becomes complicated.

Also, when using the known magnetron sputter method, a recording film is formed on a substrate on which the interval between information tracks is narrowed for higher density to thereby make a medium. A recording film generally uniform in the direction of the film surface is formed as shown in FIGS. 14A and 14B of the accompanying drawings. Therefore, when recording or erasing is effected on the track by the application of a laser beam for heating, there arises the problem of cross write or cross erase that information pits preserved on adjacent tracks are destroyed by the heat diffusion to the adjacent tracks through the film surface.

Also, there has been the problem that the application of a system using guide grooves for servo as well on the opposite sides of an information track as an information track (the land/groove recording system) is difficult because, as shown in FIG. 14C of the accompanying drawings, the width of the groove is narrow. The greater becomes the depth of the groove, the lesser becomes the amount of adherence of the film to the bottom of the groove, such that a recording film having a characteristic equal to a land cannot be formed on the guide groove.

Further, in Japanese Laid-Open Patent Application No. 6-290496, the inventor proposes a magneto-optical recording medium in which a first magnetic layer, a second magnetic layer and a third magnetic layer are successively laminated; the first magnetic layer has a magnetic wall coercivity smaller than that of the third magnetic layer; and the second magnetic layer has the Curie temperature lower than the Curie temperatures of the first magnetic layer and the third magnetic layer.

The inventor also proposes a high density recording-reproducing method of displacing the magnetic wall of the first magnetic layer present in the boundary portion of a recording mark by a temperature gradient by the use of this magneto-optical recording medium, and detecting the reversal of magnetization resulting from this displacement of the magnetic wall as a change in the polarized state of reflected light.

In this method, it is desirable to stabilize the displacement of the magnetic wall and to improve the reproducing characteristic that the magnetic wall of the forward boundary portion and the magnetic wall of the rearward boundary portion of the recording mark be separately formed independently of each other.

If a recording film is formed on a substrate according to the prior art to thereby make such a medium, a recording film is formed that is generally uniform in the direction of film surface. It has been difficult to form such a recording mark such that the front and rear magnetic walls are completely separate from each other. The reason why a recording film is formed that is uniform in the direction of the film surface is that molecules and atoms which have flown out of an evaporation source collide with one another before they reach the substrate or collide with inert gas atoms used during evaporation. Therefore, the directions in which they fly become random and they impinge on the substrate at various angles. Therefore, after the formation of the recording film, the opposite sides of the track have been annealed by a laser beam of high output to thereby carry out the process of causing the magnetic film on the side of the track to change in quality or disappear, and form a recording mark so as to extend over this processed portion, thereby separating the front and rear magnetic walls from each other.

There has also been the problem that, because the guide groove is annealed, the application of a system in which the guide grooves for servo on the opposite sides of an information track are also used as information tracks (the land/groove recording system) is difficult. The reason for this is that, as-shown in FIGS. 13, 14B and 14C, the directions of the atoms impinging on the aforementioned substrate are random, whereby the number of atoms and molecules adhering to the land portion and adhering to the bottom of the groove before they reach the groove decreases. Therefore, the same characteristic and film thickness as those on the land are not obtained.

SUMMARY OF THE INVENTION

The present invention has been made in view of the above-noted problems and an object thereof is to provide an information recording medium in which, even if the recording by a heat mode is effected by a simple recording system, the width of a mark train formed becomes constant irrespective of an information pattern, a reproduction error rate can be reduced, and a method of producing such an information recording medium.

Another object of the present invention is to provide an information recording medium in which it is difficult for cross write and cross erase to occur, even if the interval between information tracks is narrowed, and a method of producing such an information recording medium.

Still another object of the present invention is to improve, in the super-high density recording-reproducing method proposed in Japanese Laid-Open Patent Application No. 6-290496, etc., the reproducing characteristic without complicating the steps of producing a medium, to make the application of the land/groove recording system possible, and to improve the track density.

The above objects are achieved by a method of producing an information recording medium, characterized in that a recording film is not substantially formed on the slope portions of a substrate in which slope portions having surfaces non-parallel to the surface of the information track of an information recording medium are provided on the opposite sides of the information track, but a recording film of a predetermined film thickness is formed on the information track.

The above objects are achieved by an information recording medium provided with:
  a substrate comprising an information track and slope portions provided on the opposite sides of the information track and having surfaces non-parallel to the surface of the information track; and
  a recording film provided on the surface of the information track;
  the slope portions not being substantially covered with recording film.

According to the information recording medium of the present invention, a recording film hardly adheres to the slope portions between information tracks, or a film remarkably differing from the recording film on the information tracks adheres to the slope portions.

Therefore, even if recording on the information tracks is effected while protruding onto the slope portions on the opposite sides, recording can be prevented from being substantially effected on the slope portions. Accordingly, even when recording is effected by a heating operation simply corresponding to information, the width of the marks formed can be restricted on the information tracks irrespective of the pattern of information, and a mark train of a constant width can be provided.

Also, the heat during recording and erasing conducts through the recording film and diffuses toward the surface of the film, but according to the information recording medium of the present invention, the heat conduction through the recording film is remarkably suppressed by the slope portion between the information tracks. Therefore, it is difficult for the temperature to rise in the adjacent tracks and thus, cross erase/write is prevented.

Further, when the present invention is applied to the recording medium proposed in Japanese Laid-Open Patent Application No. 6-290496, the magnetic layers of the slope portions can be made into a film which does not present such magnetism that will accumulate magnetic wall energy. If the heated area during recording is formed in such a shape extending over the information track and the slope portions on the opposite sides thereof, a recording mark can be formed as a magnetic domain on the side of which no magnetic wall is present and in which the front and rear magnetic walls are substantially separate from each other.

DESCRIPTION OF THE PREFERRED EMBODIMENTS

Some embodiments to which the present invention is applied will hereinafter be specifically described with reference to the drawings.

Figure 1:
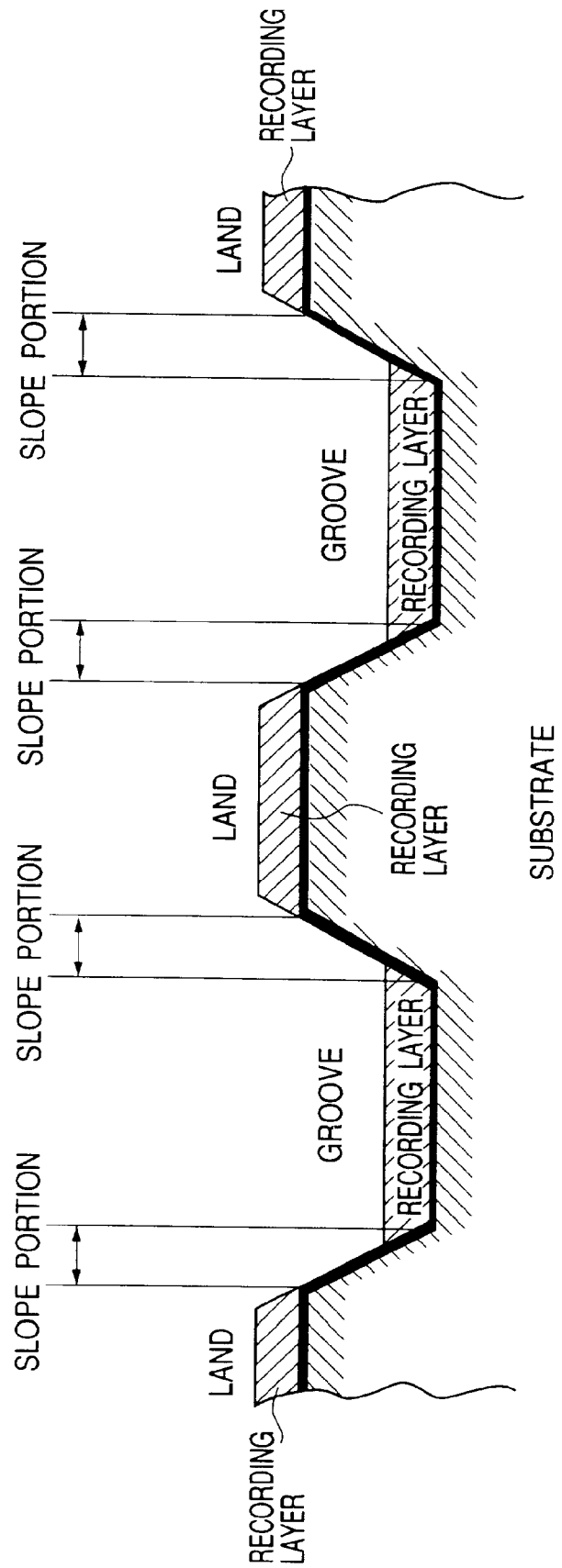
FIG. 1 is a schematic cross-sectional view showing an information recording medium according to an embodiment of the present invention.

FIG. 1 is a schematic cross-sectional view showing an information recording medium according to an embodiment of the present invention. A substrate is, for example, of a circular disc shape, and the surface thereof is formed with spiral or concentric grooves. A land portion having a flat surface parallel to the surface of the substrate is present between adjacent ones of the grooves, and this land portion is used as an information track. Also, the bottom surface of each groove may be made into a flat surface parallel to the surface of the substrate and this groove portion may also be used as an information track.

In any case, slope portions non-parallel to the surface of the substrate are present on the opposite sides of each information track. A recording layer formed of a magneto-optical recording material, a phase change recording material or the like is laminated on the surface of the substrate. Protective layers, reflecting layers, heat radiating layers or the like formed of a dielectric material, a metallic material or the like may be laminated above or under the recording layer. These layers are formed by continuous sputtering, for example, by a magnetron sputter apparatus or continuous evaporation or the like.

Figure 5:
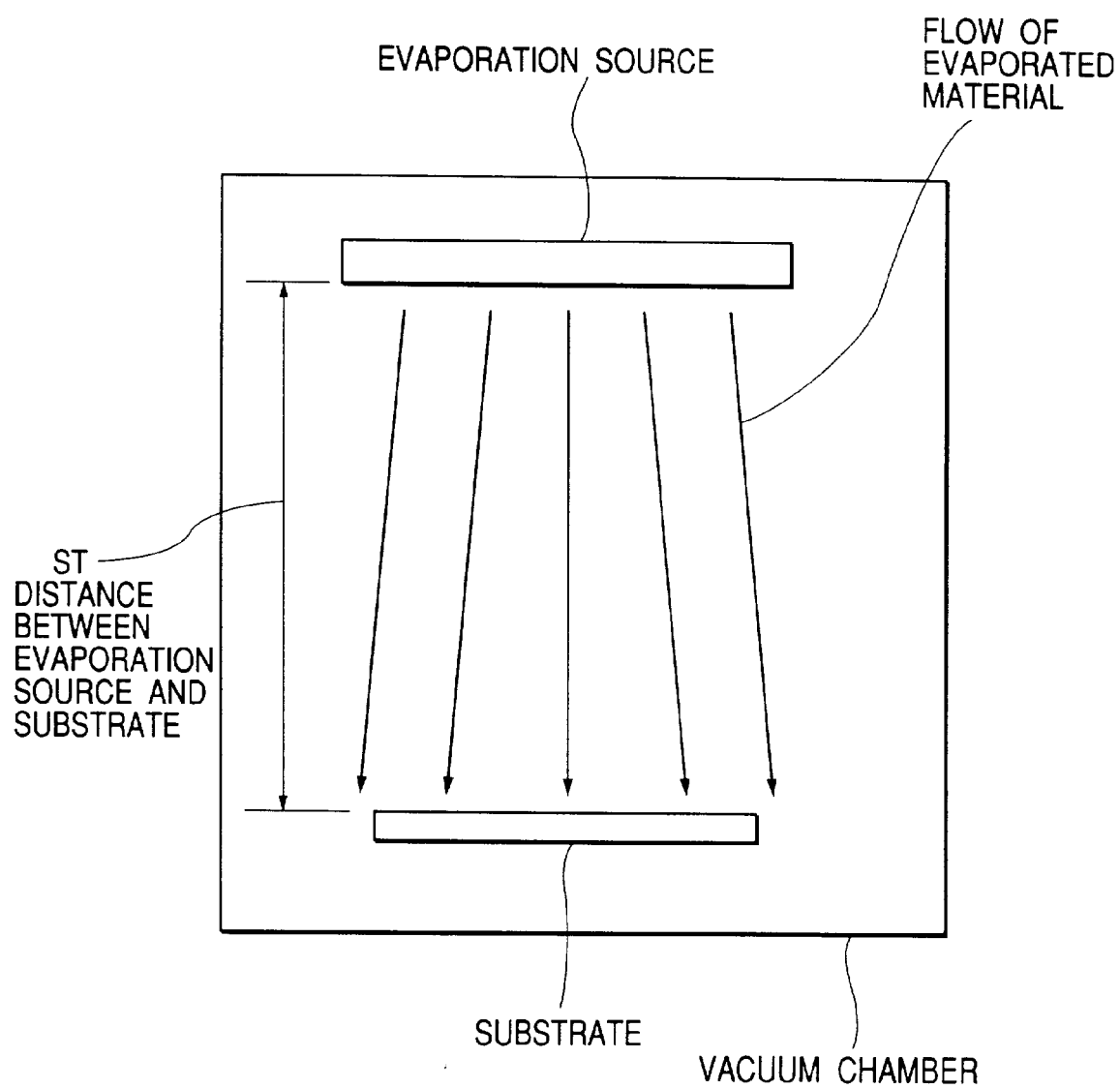
FIG. 5 is a typical view showing the producing method according to the present invention.

As an evaporation source shown in FIG. 5, use can be made of a conventional one such as a flat plate used in a conventional planar magnetron sputter, a cylinder used in a hollow cathode magnetron, a heating port or a crucible used in conventional vacuum evaporation. As a method of making the flow of evaporated material shown in FIG. 5, use can be made of a conventional method such as a conventional magnetron sputter method, an ion beam sputter method, a hollow cathode magnetron method, a resistance heating or an electron beam heating method or the adoption of an electron discharging source capable of discharging even in high vacuum.

A method of rendering uniform the direction of the flow of evaporated material impinging on the substrate and causing it to impinge on the substrate perpendicularly thereto is made possible by making the distance ST between the aforementioned evaporation source and the substrate shorter than the mean free path L, and disposing the substrate so as to be orthogonal to the direction of the flow of evaporated material.

Further, use can also be made of a conventional method of applying bias potential to the substrate to thereby create a uniform electric field on the surface of the substrate, and ionizing the flow of evaporated material between the evaporation source and the substrate. The manufacturing method of the present invention may be applied to only the recording layer of the information recording medium or may be applied to all of the constituent layers.

As the evaporated material, use can be made of a conventional material such as a dielectric material forming the information recording medium, a metallic material such as aluminum, a magneto-optical material typified by a rare earth-transition metal or a phase change material typified by GeSbTe.

As the substrate, use can be made of a plastic material such as PC, glass or photopolymer formed on glass.

The width and depth of the grooves are determined taking into account the wavelength of a laser beam used during reproduction and during recording, the memory capacity of the information recording medium, the power margin of cross erase/cross write, the margin of cross talk, and the manufacturing margin of the substrate, etc.

The details of the present invention will hereinafter be described with respect to some embodiments thereof and with reference to the drawings.

[Embodiment 1]

There was made a substrate in which the pitch of grooves was 1.2 $\mu$m and the depth of the grooves was 0.2 $\mu$m and flat portions each having a flat surface of a width 0.5 $\mu$m parallel to the surface of the substrate were provided on the land between adjacent ones of the grooves and the bottom surface portion of each groove and a slope portion was provided between each land and each groove so that the angle of inclination thereof with respect to the surface of the substrate might be about 63°. A recording layer was formed on this substrate by a sputtering step which will be described later.

The recording layer in the present embodiment was formed of a magneto-optical recording material.

Various materials are conceivable as the magneto-optical recording material, and use can be made, for example, of a rare earth-iron family amorphous alloy composed of 10 to 50 at % of one or two or more kinds of rare earth metal elements such as Pr, Nd, Gd, Tb, Dy and Ho and 90 to 50 at % of one or two or more kinds of iron family elements such as Fe, Co and Ni.

Also, a small quantity of element such as Cr, Mn, Cu, Ti, Al, Si, Pt or In may be added thereto to improve corrosion resistance.

The saturation magnetization of the rare earth-iron family amorphous alloy can be controlled by the composition ratio between the rare earth element and the iron family element.

Coercive force can also be controlled by the adjustment of saturation magnetization, but essentially vertical magnetic anisotropy is adjusted by the selection of the material elements. Generally, materials such as Tb and Dy are great in vertical magnetic anisotropy and also great in coercive force, whereas materials of the Gd system are small in anisotropy and also small in coercive force. Also, the vertical magnetic anisotropy is reduced by the addition of a non-magnetic element.

Curie temperature can also be controlled by the composition ratio, but to control it independently of saturation magnetization, a method of using a material in which part of Fe as an iron family element has been substituted for by Co and controlling the amount of substitution can be more preferably utilized. That is, by substituting Co for 1 at % of Fe, a rise of Curie temperature of about 6' C. can be expected. Therefore, by the use of this relation, the amount of addition of Co is adjusted so as to provide the desired Curie temperature.

Conversely, it is also possible to lower the Curie temperature by adding a slight quantity of a non-magnetic element such as Cr or Ti. The control of Curie temperature is also possible by using two or more kinds of rare earth elements and adjusting the composition ratio thereof.

The specific forming step for the recording layer in the present embodiment is as follows.

A B-doped Si target, an alloy target of Tb 0.22 (FeCo 0.05) and an Al target were mounted on a DC magnetron sputtering apparatus, and the substrate formed as previously described was fixed to a substrate holder so that the surface of the substrate might be parallel and opposed to the surfaces of the targets, whereafter the interior of a chamber was evacuated by a cryopump until it became a high vacuum of $1\times10^{-5}$ Pa or less.

Ar gas was introduced into the chamber while the interior of the chamber was kept evacuated, and electric power was supplied to each target to thereby sputter while the substrate was rotated. A SiN layer and a TbFeCo layer were successively formed on the substrate so as to have a film thickness of 80 nm and a film thickness of 50 nm, respectively.

During the formation of the SiN layer, $N_2$ gas was introduced in addition to Ar gas, and the SiN layer was formed by DC reactive sputter. Also, the pressure of Ar gas during the formation of the TbFeCo layer was 0.5 Pa and the supplied power to the targets was 500 W.

The above-mentioned film thicknesses are the film thicknesses on the flat portions of the lands and grooves on the substrate disposed parallel to the surfaces of the targets.

Generally, the film forming speed by sputter is non-isotropic and depends on the inclination of the substrate. As a result of a preliminary test, it was confirmed that a film thickness of about 55% of that of the flat portion was provided on the slope portion inclined by about 63° with respect to the surface of the target. That is, by the above-described film formation, recording film of about 27.5 µm adheres to the slope portion.

So, next, electric power of 300 W was supplied to the substrate side to thereby reversely sputter, and the etching of the recording film was effected.

Generally, the film forming speed by reverse sputter is nearly isotropic and does not depend much on the inclination of a substrate. As the result of a preliminary test, the etching speed on the slope portions inclined by about 630 with respect to the surface of the substrate was found to have no significant difference from the etching speed on the flat portions, and both were of the order of 3 nm/min.

So, the above-described etching was effected for 10 minutes to thereby remove the recording film on the slope portions and keep recording film of about 20 µm left on the flat portions.

Subsequently, an SiN layer was formed to a film thickness of 20 nm, and lastly an Al layer was formed to a film thickness of 50 nm.

This disc was taken out of the chamber and the film surface thereof was coated with UV resin.

Comparative Example 1

As a comparative example, a sample was made in a manner similar to Embodiment 1 with the exception that a TbFeCo layer was formed so as to have a film thickness of 20 nm, whereafter an SiN layer and an Al layer were formed without etching being effected.

The samples of the embodiment of the present invention and the comparative example which were made in this manner were set on a drive apparatus having an optical head of a laser wavelength 680 nm and an objective lens of NA 0.55, and were rotated at a constant period. Tracking servo was applied onto the lands, and the measurement of the recording characteristic was effected at a position of radius 30 nm.

The recording bias magnetic field was 300 Oe, the recording power was changed, and (1–7)RLL random data were mark-edge-recorded. The driving waveform of the laser was such that its rising was delayed by 1T relative to an input signal, and a laser pulse of a width (n-1)T was applied to a signal of a width nT. The clock frequency was 25 MHz so that the shortest mark length might be 0.75 µm.

This random data was reproduced by reproduction power 1.5 mW, an analog signal waveform obtained was sliced at DC level and binarized, and the interval of the rising edge was measured. Jitter distribution in 105 samples relative to all data patterns was derived, and the recording power dependency of jitter margin was compared with respect to each sample.

Figure 2:
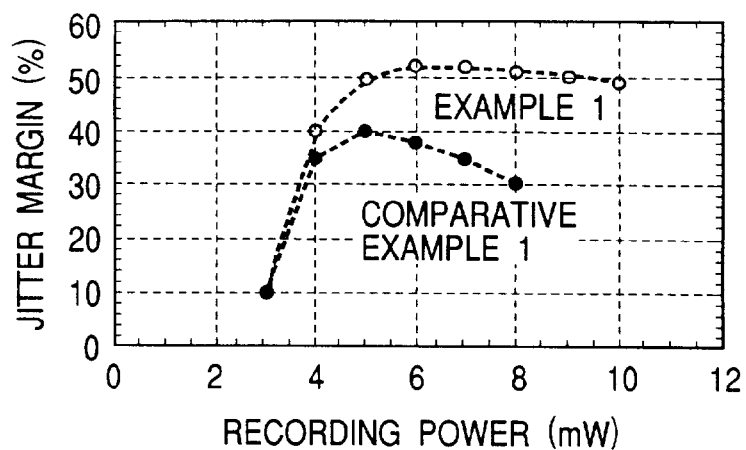
FIG. 2 is a graph showing the recording power dependency of jitter margin.

The result is shown in FIG. 2. In the sample of Embodiment 1, a jitter margin of a sufficient size was obtained in a wide recording power range, whereas in the sample of Comparative Example 1, the recording power dependency of jitter margin was strong. Moreover, even in the optimum recording power, a jitter margin of a sufficient size was not obtained.

Next, the effect for cross erase/write was examined. First, repeated patterns of a mark length 0.75 µm were recorded on the lands and the initial carrier level was measured, and then tracking servo was applied onto the adjacent groove and a DC laser was applied thereto, whereafter tracking was returned onto the lands and the carrier level was measured again.

Figure 3:
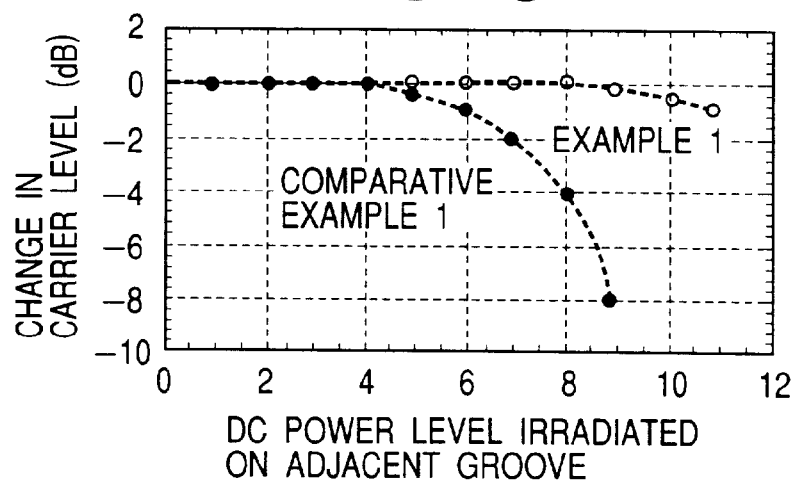
FIG. 3 is a graph showing the dependency of a change in carrier level on a land upon DC laser power applied on an adjacent groove.

FIG. 3 shows the dependency of the change from the initial level of the carrier level at this time on the DC laser power applied onto the adjacent groove. It is seen that the sample of Embodiment 1, as compared with the sample of Comparative Example 1, is greatly improved in cross erase/write resistance.

[Other Embodiments]

To improve productivity in the steps of Embodiment 1, it is better for the time required for etching to be as short as possible. A film forming step in which the recording layer is not laminated even if etching is not done is desirable.

For that purpose, it is preferable to adopt a film forming method which is as great as possible in the non-isotropy of the film forming speed and strong in directionality. For example, a film forming method such as the evaporation method which is capable of forming film basically in high vacuum is strong in directionality because particles emerged from the source keep travelling straight on. Also, even when the sputter method is used, low pressure sputter can be adopted or the applied voltage to the targets can be made high to thereby reduce the rate of going round and enhance directionality.

Further, it is also possible to use the collimate sputter method in which a grating-like collimate electrode is disposed in a film forming chamber in a direction perpendicular to the surface of a substrate. This method is a film forming method of causing sputter particles flying obliquely with respect to the substrate to adhere to a collimator and causing only particles having a great deal of component perpendicular to the surface of the substrate to arrive at the substrate.

As another method of causing only the particles having a great deal of component perpendicular to the surface of the substrate to arrive at the substrate, it is possible by making the distance ST between the evaporation source and the substrate shorter than the mean free path L, and disposing the substrate so as to be orthogonal to the direction of the flow of evaporated material.

Figure 6A:
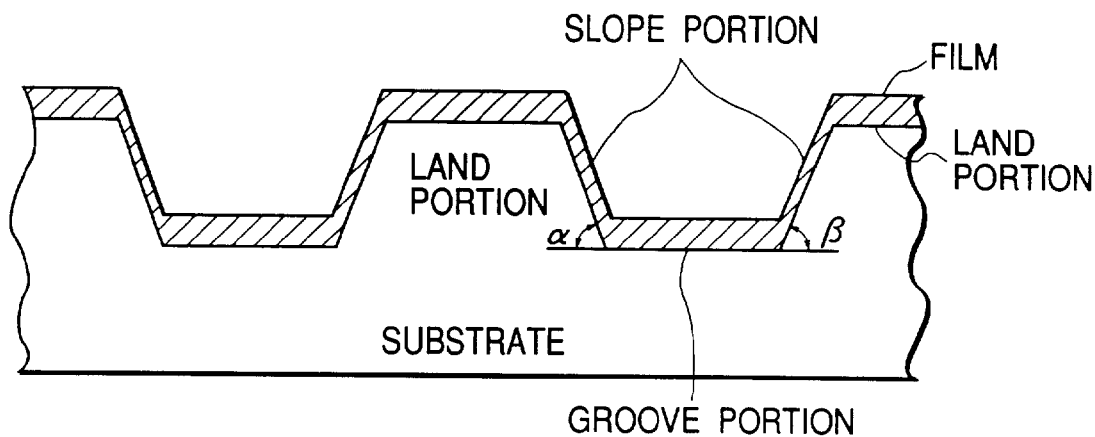
FIGS. 6A and 6B are typical cross-sectional views showing the manner of adherence of film in an information recording medium having lands and grooves which has been produced by the producing method according to the present invention.
Figure 6B:
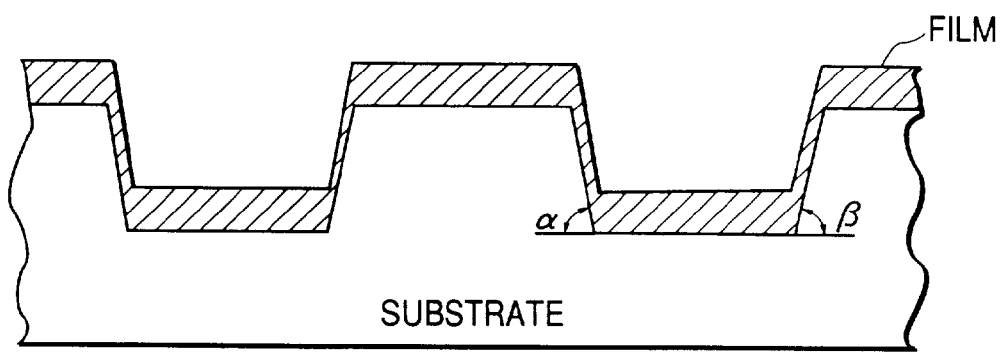

A description will be provided in greater detail with reference to FIGS. 5, 6A and 6B.

Evaporated materials evaporated from the evaporation source by sputtering or heating by inert gas arrive at the substrate with some energy substantially without colliding with one another, if the distance ST between the evaporation source and the substrate is shorter than the mean free path L (expression (1) below) of evaporated molecules and atoms in the pressure of a well known atmosphere formed by the flow of evaporated materials.

Mean free path L (cm)=$5\times10^{-3}$/p (Torr)    (1)

Also, the flow of evaporated materials usually flies from the evaporation source toward the substrate with some expanse, but almost all of the flow of evaporated materials can be caused to impinge on the substrate perpendicularly thereto by selecting conditions such as the size of the evaporation source, the disposition of the evaporation source and the substrate, the angle formed between the evaporation source and the substrate, the distance between the evaporation source and the substrate, the method of evaporating, the pressure of the evaporation atmosphere, and the use of a collimator having an opening portion for rendering uniform the flow of evaporated materials in parallel.

By the film forming method of reducing the rate of going round and causing the evaporated materials to impinge on the substrate perpendicularly thereto as described above, the amount of adherence of film to the slope portions can be greatly reduced, as shown in FIGS. 6A and 6B. Also, the amount of adherence of film to the groove bottom portions in which the width of the grooves is narrow and the depth of the grooves is great, that is, the aspect ratio (the groove depth/the groove width) which is great can be made equal to that on the land portions. Therefore, the film thicknesses, the compositions and the film utilities of the land portions and the groove bottom portions become equal.

Also, to suppress the film formation on the slope portions, it is effective to make the angle of inclination of the slope portions with respect to the surface of the substrate great.

As the etching method, a method in which the non-isotropy of etching is as small as possible and the etching speed is high and the irradiation damage and temperature rise of the surface by high-speed ions are little is desirable. Besides the reverse sputter method shown in Embodiment 1, the reactive ion etching method using reactive gas and various plasma etching methods can preferably be used. Also, not only dry etching but a wet etching method such as dipping may be applied.

[Embodiment 2]

Use was made of a substrate similar to that of Embodiment 1, with the exception that the pitch of the grooves was 1.1 $\mu$m and the angle of inclination of the slope portions with respect to the surface of the substrate was about 76°. The pressure of Ar gas during the formation of TbFeCo layer was 0.1 Pa, the supplied power to the targets was 1500 W, and the film was formed so that the film thickness might be 20 nm. Thereafter, a sample was made in the same manner as Embodiment 1, with the exception that without etching being effected, an SiN layer and an Al layer were formed.

In this sample, the angle of inclination of the slope portions of the substrate with respect to the surface of the substrate is great, the rate of going round during the formation of the TbFeCo layer is reduced, and the directionality is high and therefore, the recording film adheres only slightly to the slope portions even if etching is not effected.

When this sample was evaluated by a method similar to that of Embodiment 1, it is inferior to Embodiment 1 in respect of the size of jitter-margin, the recording power margin at which a predetermined jitter margin is obtained, and the cross erase/write resistance, but a sufficient effect was found as compared with Comparative Example 1.

[Embodiment 3]

In Embodiment 2, the Al layer to be formed last was formed to a film thickness of about 100 nm. Thereafter, $CCl_4$ was introduced as a reactive gas and the Al layer was etched by the plasma etching method until the film thickness thereof became about 50 nm. By this etching, the Al film on the slope portions was completely removed and the SiN layer formed immediately before it became exposed. Next, $CF_4$ was introduced as a reactive gas, and this SiN layer was removed by the plasma etching method. As the result, a TbFeCo recording film slightly adhering to the slope portions became exposed. In the present embodiment, this recording film was not physically removed, but it was exposed to reactive gas for a predetermined time, whereby it was chemically changed in quality and the magnetism thereof was made to disappear so that it might not function as a recording film. When the sample thus made was evaluated by a method similar to that of Embodiment 1, an effect equal to that of Embodiment 1 was found.

The method of the present embodiment is high speed in the etching process and is good in productivity. Also, the recording layer on the flat portions utilized as recording tracks is not directly exposed to plasma. Therefore, the recording layer is not at all damaged. Further, there is the merit that the film thicknesses of the recording layer and a layer such as an optical interference layer of which the film thickness need be strictly controlled can be highly accurately controlled by only the film forming process and are not affected by the irregularity in the etching process.

In this sample, the layer functioning as a protective film on the slope portions is removed. Therefore, the corrosion of the recording layer may progress from these portions. To avoid this, a protective layer formed of SiN or the like material may be newly added after the completion of the above-described etching process.

[Embodiment 4]

In Embodiment 2, during the formation of TbFeCo layer, a voltage was applied to the substrate and bias sputter was effected. The bias voltage was adjusted so that, on the slope portions, the adherence speed by the sputter and the etching speed by the bias sputter might become equal to each other. Film was formed until the film thickness of the flat portions became 20 nm. A sample was made in a manner similar to Embodiment 2 in the other points.

When the sample thus made was evaluated by a method similar to that of Embodiment 1, an effect equal to that of Embodiment 1 was found.

Description will now be made of a case where the present invention is applied to a recording medium proposed in Japanese Laid-Open Patent Application No. 6-290496.

In this case, a magnetic multi-layer film in which first, second and third magnetic layers are successively laminated is used as the recording film. The first magnetic layer comprises a magnetic film which has a magnetic wall coercivity smaller than that of the third magnetic layer at a temperature in the vicinity of ambient temperature, the second magnetic layer comprises a magnetic film which has the Curie temperature lower than those of the first magnetic layer and the third magnetic layer, and the third magnetic layer comprises a perpendicular magnetization film. A gradient of Curie temperature may be imparted to the first magnetic layer in the direction of the film thickness thereof so that the Curie temperature may drop in the constituent portion thereof on the second magnetic layer side.

[Embodiment 5]

A recording film was formed on the substrate used in Embodiment 1 by the film forming step as described above.

Targets of B-doped Si, Gd, Tb, Fe, Co and Cr were mounted on a DC magnetron sputtering apparatus and the aforementioned substrate was fixed to a substrate holder, whereafter the interior of the chamber was evacuated by a cryopump until a high vacuum was created of $1 \times 10^{-5}$ Pa or less.

Ar gas was introduced into the chamber while the interior of the chamber was kept evacuated, and an SiN layer, a GdFeCo layer as a first magnetic layer, a TbFeCr layer as a second magnetic layer, a TbFeCoCr layer as a third magnetic layer, and an SiN layer were successively formed to 90 nm, 30 nm, 10 nm, 80 nmm and 60 nmm, respectively, while the substrate was rotated.

Here, $CF_4$ was introduced as a reactive gas and the SiN layer was etched by the plasma etching method until the film thickness thereof became about 30 nm. By this etching, the SiN film on the slope portions was completely removed and the magnetic layer formed immediately before became exposed. Next, a $NH_3$—Co mixture gas was introduced as a reactive gas and the magnetic layers on this portion were removed by the plasma etching method. Lastly, an Al layer as a heat radiating and protective layer was formed to 40 nm.

During the formation of the SiN layer, $N_2$ gas was introduced in addition to Ar gas, and the SiN layer was formed by DC reactive sputter.

The above-mentioned film thicknesses are the film thicknesses on the flat portions of the lands and grooves on the substrate disposed parallel to the surfaces of the targets.

As regards the respective magnetic layers, by adjusting the distribution of the power supplied to each target, the composition ratio between rare earth element and iron family element was adjusted so as to be in the vicinity of compensation composition. The amounts of addition of Co and Cr were adjusted so that the Curie temperature might be 210° C. for the first magnetic layer, 160° C. for the second magnetic layer and 290° C. for the third magnetic layer.

At a temperature in the vicinity of ambient temperature, the magnetic wall coercivity of the first magnetic layer is 100° c or less, and the magnetic wall coercivity of the third magnetic layer is 20 kOc or greater.

This disc was taken out of the vacuum chamber and the film surface thereof was coated with UV resin.

Comparative Example 2

A sample was made similar to that of Embodiment 5 with the exception that, after the formation of the magnetic layers, an SiN layer and an Al layer were successively formed to 30 nm and 40 nm, respectively, and etching was not effected.

Each sample thus made was set on a drive apparatus having an optical head of a laser wavelength 680 nm and an objective lens of NA 0.55, and was rotated at a constant period of 7.5 Hz, and the measurement of recording characteristic was effected at a position of a radius 31.8 mm.

A DC laser for recording was applied while a magnetic field was modulated at 7.5 MHz by a sliding type magnetic head, and a repeated pattern of a mark length 0.1 μm was recorded by magnetic field modulation.

Figure 4:
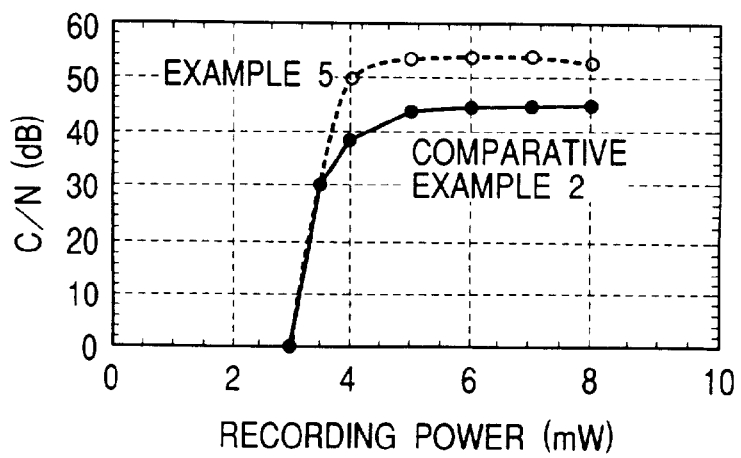
FIG. 4 is a graph showing the recording power dependency of C/N.

FIG. 4 shows the result of this signal having been reproduced by reproducing power 2.5 mW and the recording power dependency of C/N having been compared among the samples. Here, evaluation was done by an ordinary one-beam optical system and a temperature gradient for displacing the magnetic wall was formed by the heating by a reproducing beam itself.

As is apparent from FIG. 4, the sample of Embodiment 5 was improved in C/N by 5 dB or greater as compared with the sample of Comparative Example 2 when the recording power was about 4 mW or greater.

As regards the sample of Embodiment 5, if a recording power greater than a predetermined power is applied and a heated area during recording is formed so as to extend over a recording track and the slope portions on the opposite sides thereof, a recording mark can be formed as a magnetic domain in which no magnetic wall is present on the side of the magnetic domain and the front and rear magnetic walls on the recording track are substantially separate from each other. Therefore, the magnetic wall on the recording track can be stably displaced in the direction of the track by a temperature gradient.

In contrast, in the sample of Comparative Example 2, even if the heated area during recording is formed so as to extend over the recording track and the slope portions on the opposite sides thereof, magnetic walls are also formed on the slope portions. Therefore, a magnetic wall is present on the side of the magnetic domain and a recording mark is formed as a magnetic domain in which the front and rear magnetic walls on the recording track are connected together and closed through the magnetic wall on the side.

Therefore, when the magnetic wall on the recording track is displaced in the direction of the track by a temperature gradient, the ease of the displacement of the magnetic wall changes, depending on whether the direction of the displacement is a direction for enlarging the magnetic domain, or a direction for reducing the magnetic domain. Thus, the magnetic wall is not stably displaced and noise becomes great.

The above-described effect is an effect during the reproduction regarding the first magnetic layer. Further the present invention has an effect of improving the preservability of a minute magnetic domain, as will be described below, by separating the front and rear magnetic walls of the third magnetic layer on the recording track from each other.

The modulation frequency was changed and repeated patterns from mark lengths of 0.1 μm to 0.05 μm were recorded by magnetic field modulation. As a result, in the sample of Embodiment 5, the recording pattern could be confirmed up to a mark length of 0.05 μm, while in the sample of Comparative Example 2, the magnetic domain shrank to a mark length of 0.08 μm or less and the recording pattern could hardly be confirmed.

As in the case of Embodiment 1, regarding also the size of the jitter margin, a recording power margin for which a predetermined jitter margin could be obtained, and the cross erase/write resistance, the sample of Embodiment 5 had a sufficient effect relative to the sample of Comparative Example 2.

[Embodiment 6]

Description will hereinafter be made of an example in which the producing method according to the present invention is applied to the recording medium proposed in Japanese Laid-Open Patent Application No. 6-290496. In this case, magnetic multi-layer film in which at least first, second and third magnetic layers are successively laminated is used as a recording film. The first magnetic layer comprises a magnetic film which has magnetic wall coercivity lower than that of the third magnetic layer at temperatures in the vicinity of ambient temperature, the second magnetic layer comprises a magnetic film which has a Curie temperature lower than those of the first and third magnetic layers, and the third magnetic layer comprises a perpendicular magnetization film. A gradient of Curie temperature may be imparted to the first magnetic layer in the direction of the film thickness so that the Curie temperature may drop in the constituent portion thereof on the second magnetic layer side.

Figure 7:
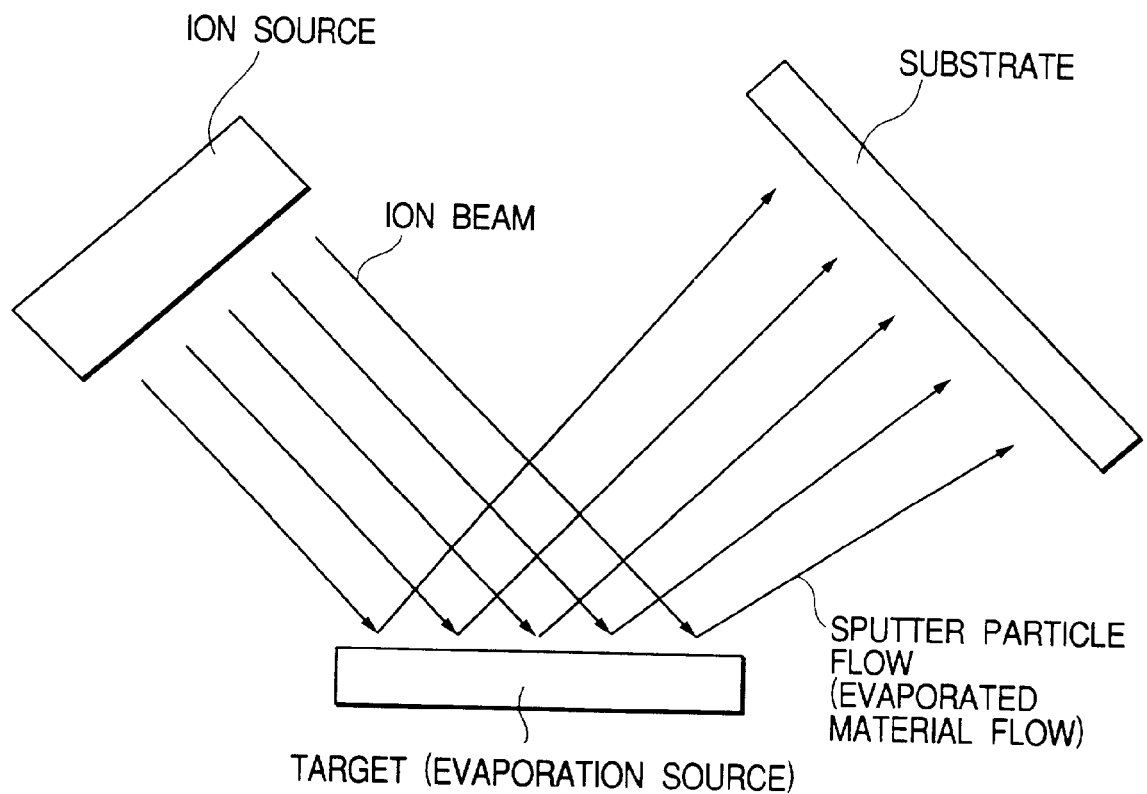
FIG. 7 is a typical view showing an ion beam sputter method used in an embodiment of the present invention.

A substrate having a diameter of 86 mm in which the pitch of grooves was 1.0 μm and the level difference (depth) of the grooves was 0.2 μm and flat portions each having a flat surface of a width 0.43 μm parallel to the surface of the substrate were provided on the land portion between the grooves and the bottom surface portion of the groove portion and which was molded so that the angle of inclination of the slope portion between the land and the grooves might be about 70° was mounted on the substrate holder of an ion beam sputter apparatus, as shown in the typical view of FIG. 7. The distance between a target and the substrate holder is about 20 cm.

The interior of the apparatus was evacuated to the degree of final vacuum $5.0 \times 10^{-7}$ Torr ($6.65 \times 10^{-5}$ Pa) or less, whereafter an argon ion beam containing nitrogen was applied to a silicon target while the interior of the apparatus was kept evacuated. An SiN film which was an interference layer was formed to 90 nm by the operating pressure of $1 \times 10^{-4}$ Torr (0.0133 Pa) while the substrate was rotated.

The average free stroke at this pressure is about 50 cm from expression I. The target was changed without the vacuum being continuedly broken, and an alloy target formed of the constituent elements of the respective magnetic layers was used to form a magnetic film.

A GdFeCoCr layer as a first magnetic layer, a TbFeCr layer as a second magnetic layer and TbFeCoCr layer as a third layer were successively formed to 30 nm, 10 nm and 80 nm, respectively. Lastly, as previously described, an SiN layer as a protective layer was formed to 80 nm.

The above-mentioned film thicknesses are the thicknesses on the land portions.

The amounts of Co and Cr were adjusted so that the composition of each magnetic layer might be in the vicinity of the compensation composition, and the Curie temperature was set so as to be 210° C. for the first magnetic layer, 120° C. for the second magnetic layer, and about 290° C. for the third magnetic layer.

The angle formed between the target and the ion beam was 45°. A film was formed with the angle formed between the target and the substrate holder, the ion beam voltage, the ion beam current and the operating pressure being adjusted so as to be optimum for the respective layers. This disc was taken out of the film forming chamber and a protective coat of UV hardened resin was formed on the film surface thereof.

Comparative Example 3

Not by the use of the ion beam sputter method, but by the conventional magnetron sputter method, a sample similar to that of Embodiment 6 was made under sputter pressure of 0.3 Pa and with the distance of about 18 cm between the target and the substrate.

Each sample thus made was set on a drive apparatus having an optical head of a laser wavelength 680 nm and an objective lens of NA 0.55, and was rotated at a constant period of 7.5 Hz. The measurement of recording characteristic was effected at a position of a radius 31 mm. A DC laser for recording was applied onto the lands while a magnetic field was modulated at 7.5 MHz by a sliding type magnetic head. Repeated patterns of a mark length 0.1 $\mu$m were recorded by magnetic field modulation.

This signal was reproduced by reproducing power of 2.5 mW, and the recording power dependency of C/N was compared with regard to each sample. Here, evaluation was done by an ordinary one-beam optical system, and a temperature gradient for displacing the magnetic wall was formed by the heating by a reproducing beam itself.

The sample of Embodiment 6 was improved in C/N by 5dB or more as compared with the sample of Comparative Example 3 when the recording power was 4 mW or greater. In the sample of Embodiment 6, if a recording power of predetermined power or greater is applied and a heated area during recording is formed so as to extend over the recording track and the slope portions on the opposite sides thereof, film is more or less piled up also on the slope portions and the magnetic layers are connected together as previously described. But, as compared with the other portions, in these portions, the film thickness becomes very small and therefore, magnetic coupling on the slope portions can be neglected. Thus, no magnetic wall is present on the side wall of the magnetic domain, and a recording mark can be formed as a magnetic domain in which the front and rear magnetic walls on the slope portions are substantially separate from each other. Therefore, the magnetic wall on the recording track can be stably displaced in the direction of the track by the temperature gradient.

In contrast, in the sample of Comparative Example 3, even if a heated area during recording is formed so as to extend over the recording track and the slope portions on the opposite sides thereof, magnetic walls are also formed on the slope portions. Therefore, a magnetic wall is present on the side of the magnetic domain and a recording mark is formed as a magnetic domain in which the front and rear magnetic walls on the recording track are connected together and closed through the magnetic wall on the side. Therefore, when the magnetic wall on the recording track is displaced in the direction of the track by a temperature gradient, the ease of the displacement of the magnetic wall is changed, depending on whether the direction of the displacement is a direction for enlarging the magnetic domain or a direction for reducing the magnetic domain. Therefore, the magnetic wall is not stably displaced, but noise becomes great and the C/N ratio becomes bad. The above-described result was recorded and reproduced on the lands, but a similar result was obtained even when recording and reproduction were done on the grooves.

The above-described effect is the effect during reproduction regarding the first magnetic layer. The present invention also has an effect of improving the preservability of a micro magnetic domain, as will be described below by separating the front and rear magnetic walls of the third magnetic layer on the recording track from each other. The modulation frequency was changed, and repeated patterns up to 0.05 $\mu$m were recorded at intervals of a mark length of 0.1 $\mu$m to 0.01 $\mu$m by magnetic field modulation.

As a result, in the sample of Embodiment 6, a recorded pattern group could be confirmed up to a mark length of 0.05 $\mu$m, while in the sample of Comparative Example 3, the magnetic domain shrank to a mark length of 0.08 $\mu$m or less and no recording pattern could be confirmed.

In respect of the size of jitter margin, the recording power margin at which a predetermined jitter margin can be obtained, cross write/cross erase and cross talk, the sample of Embodiment 6 was found to have a sufficient effect relative to the sample of Comparative Example 3.

[Embodiment 7 and Comparative Example 4]

The sample of Embodiment 7 was made by a manufacturing method similar to that of Embodiment 6, with the exception that the magnetic layer, as disclosed in Japanese Laid-Open Patent Application No. 2-240845, is a single layer formed of TbFeCo, the thickness of the magnetic layer is about 25 nm, and the magneto-optical recording medium has an aluminum layer as a reflecting film on the SiN film.

As Comparative Example 4, a sample was made by the use of the conventional magnetron sputter method as in Comparative Example 3.

These samples were set on a drive apparatus having an optical head of a laser wavelength 680 nm and an objective lens of NA 0.55, and were rotated at a constant period of 5.0 Hz. Tracking servo was applied onto the lands, and the measurement of recording characteristic was effected at a position of a radius 30 mm. The recording bias magnetic field was 3000e, and the recording power was changed.

(1–7)RLL random data was mark-edge-recorded. The driving waveform of the laser had its rising delayed by 1T relative to an input signal so that a laser pulse of a width of (n-l)T might be applied to a signal of a width of nT. The clock frequency was 25 MHz so that the mark length might be 0.75 μm.

This random signal was reproduced by reproducing power 1.5 mW, and an analog signal waveform obtained was sliced at DC level and binarized, and the interval of rising edge was measured. The relative jitter distribution on $10^5$ samples relative to all data patterns was then derived, and the recording power dependency of jitter margin was compared with respect to each sample.

In Embodiment 7, a jitter margin of a sufficient size was obtained in a wide recording power range, whereas in the sample of Comparative Example 4, the recording power dependency of jitter margin was great. Moreover, a jitter margin of a sufficient size was not obtained even at optimum recording power. Next, the effect for cross write/erase was examined. First, repeated patterns of a mark length 0.75 μm were recorded on the lands and the initial carrier level was measured, whereafter tracking servo was applied onto the adjacent groove and a DC laser was applied thereto. Thereafter, the tracking servo was returned onto the lands and the carrier level was measured. The dependency of the change in the carrier level at this time from its initial level on the DC laser power applied on the adjacent groove was examined.

The sample of Embodiment 7, as compared with the sample of Comparative Example 4, was greatly improved in the resistance to the cross write/cross erase. Also, recording similar to that on the land portions was effected on the grooves and jitter margin, cross write/cross erase, and cross talk from the adjacent track were examined, but they were equal to those on the lands and were at a level free of problems.

[Embodiment 8]

A sample was made by a manufacturing method similar to that of Embodiment 6 with the exception that instead of the magneto-optical recording medium in Embodiment 6, use was made of a phase change recording medium using ZnS.S1O$_2$ as a dielectric material protective layer, GeSbTe as a recording layer and Au as a reflecting layer.

As in Embodiment 7, this sample was evaluated by a drive apparatus with the result that the land portions and the groove portions exhibited a practical characteristic, and also exhibited improved characteristics in respect of the cross write/cross erase and the cross talk from the adjacent track, as compared with the sample made by the conventional magnetron sputter method.

[Embodiment 9]

Figure 8:
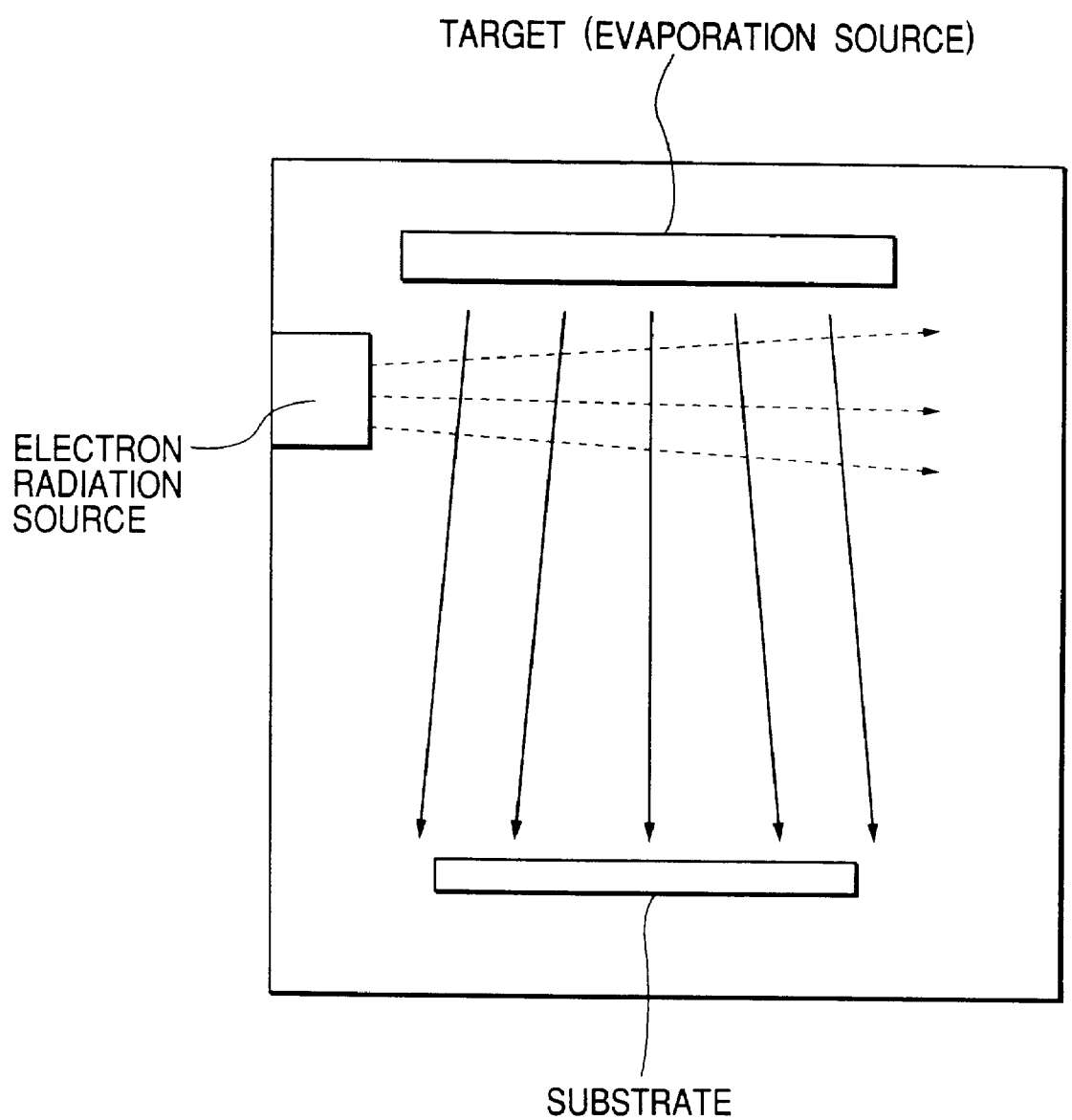
FIG. 8 is a typical view showing a magnetron sputter method provided with an electron radiation source used in an embodiment of the present invention.

A sample was made similar to that of Embodiment 6 with the exception that, in Embodiment 6, instead of the ion beam sputter method, an electron discharging source was provided in a conventional magnetron sputter apparatus as shown in FIG. 8 and discharge was made possible at the same degree of pressure as in Embodiment 6 wherein discharge could not be effected by a conventional magnetron sputter. As the electron discharging source, use can be made of the hollow cathode neutrizer of Ion Fech Inc. which is commercially available. When the sample thus made was evaluated by a method similar to that of Embodiment 6, there was found an effect equal to that of Embodiment 6.

[Embodiment 10]

Figure 9:
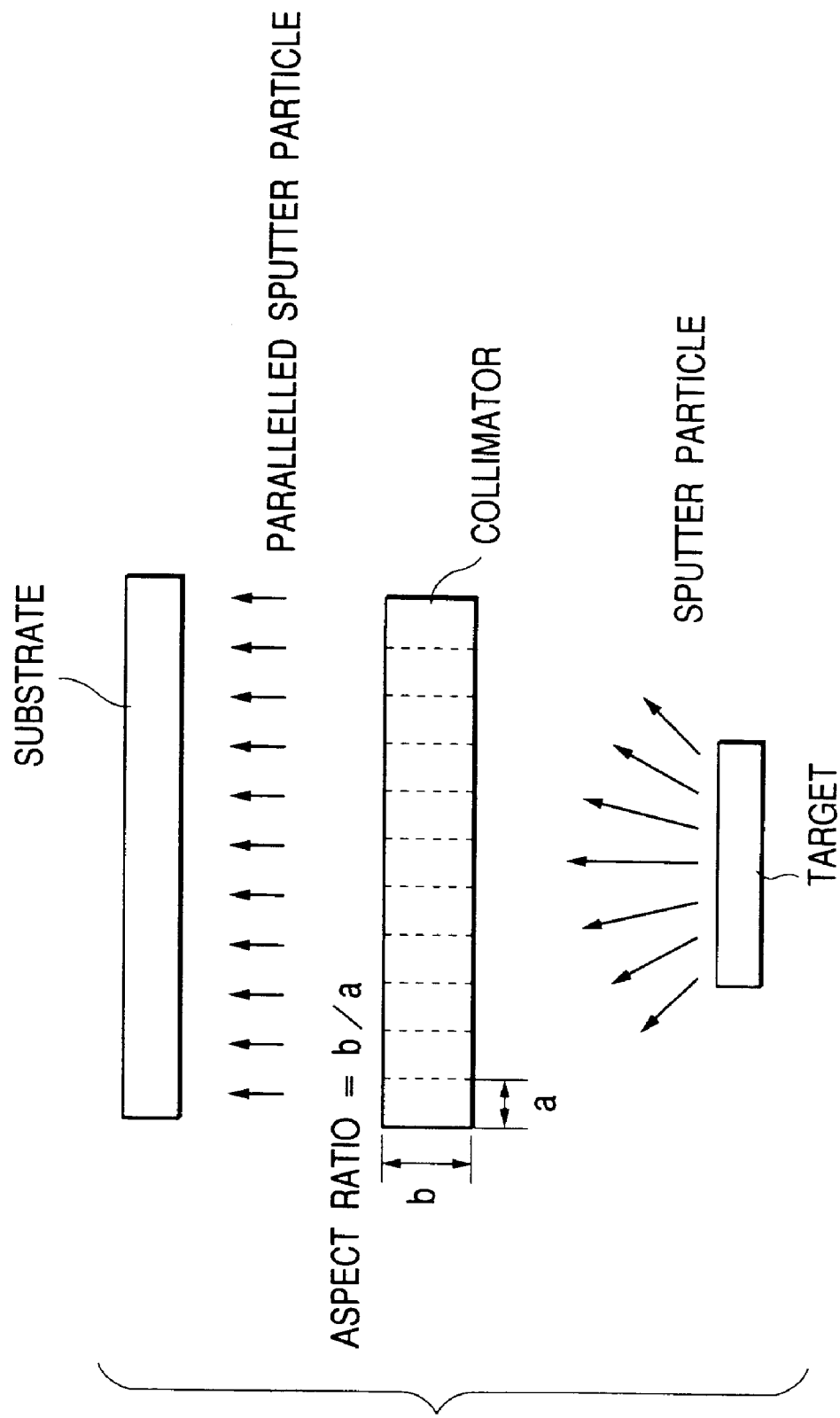
FIG. 9 is a typical view showing a magnetron sputter method provided with a collimator used in an embodiment of the present invention.

A sample was made in which a magneto-optical recording layer similar to that in Embodiment 6 was formed on a substrate similar to that of Embodiment 6 with the exception that, in Embodiment 6, instead of the ion beam sputter method, a collimator as shown in FIG. 9 was provided between the target and the substrate holder of a conventional magnetron sputter apparatus, and the aspect ratio (the length of the opening portion/the diameter of the opening) of the collimator was 2 and the sputter pressure was 0.1 Pa. This collimator has the function of collimating particles sputtered from the target and is disposed so that the particles may impinge on the substrate perpendicularly thereto, and may be the honey comb collimator of Eldim Inc., U.S.A. which is commercially available.

When the sample thus made was evaluated by a method similar to that of Embodiment 6, there was found an effect equal to that of Embodiment 6. This collimator may be applied to Embodiment 6.

[Embodiment 11]

Figure 10:
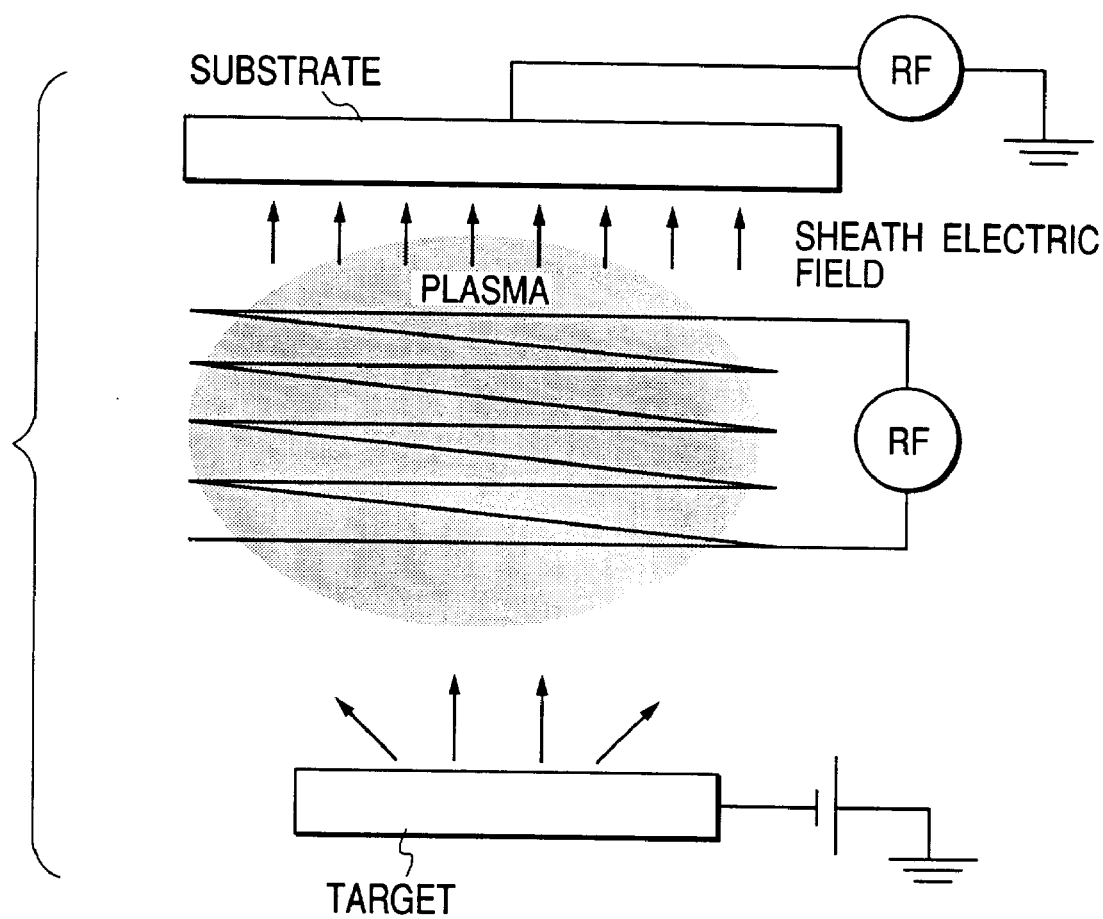
FIG. 10 is a typical view showing an ionized metal plasma bias sputter method used in an embodiment of the present invention.

A sample was made in which a magneto-optical recording layer similar to that in Embodiment 6 was formed on a substrate similar to that of Embodiment 6 with the exception that, in Embodiment 6, instead of the ion beam sputter method, use was made of a method of providing an RF coil for ionizing sputter particles sputtered from a target as shown in FIG. 10 between the target and the substrate, and sputtering at pressure of 0.3 Pa with RF bias applied to the substrate.

When the sample thus made was evaluated by a method similar to that of Embodiment 6, an effect equal to that of Embodiment 6 was found.

[Embodiment 12]

Figure 11:
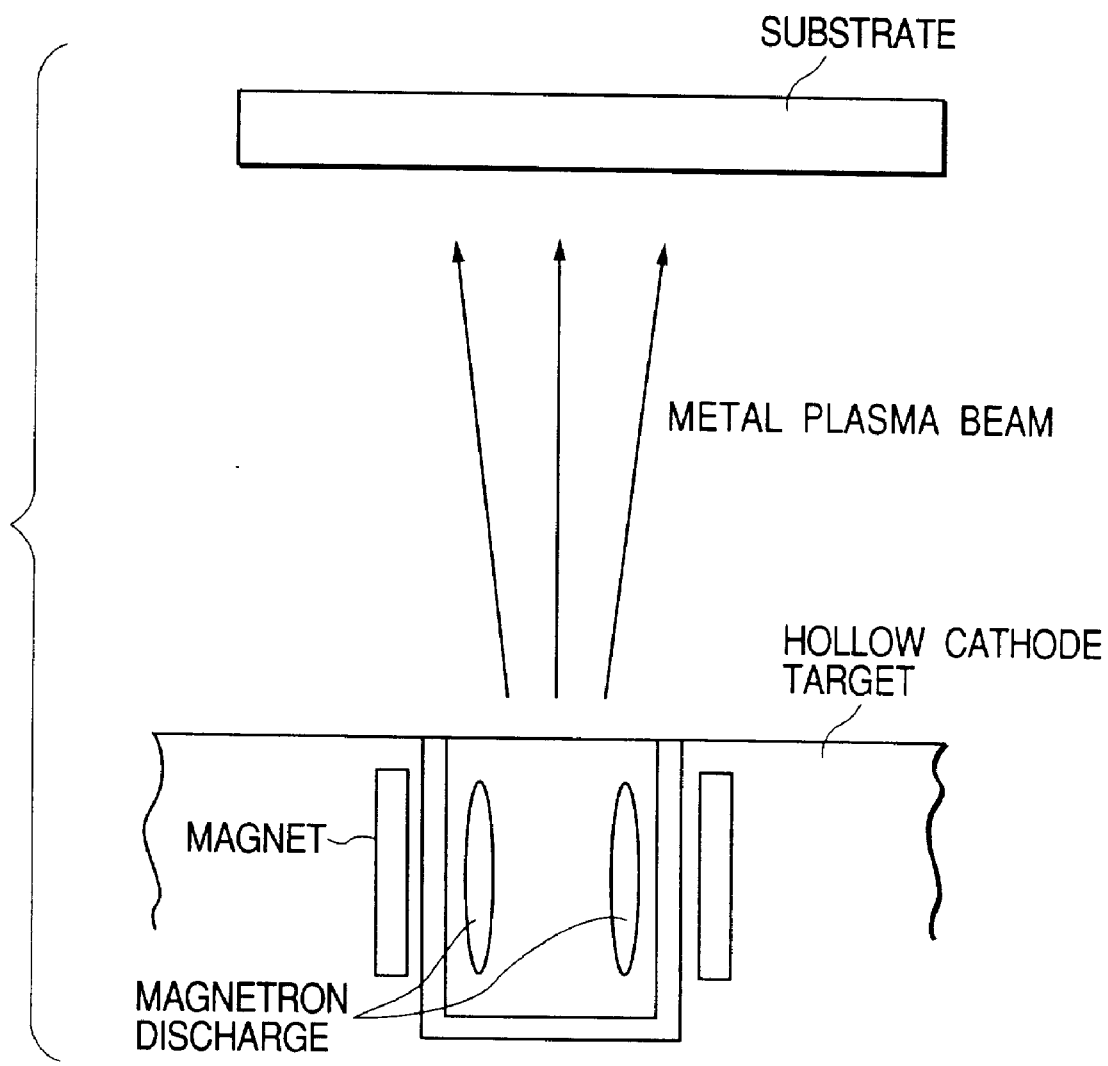
FIG. 11 is a typical view showing a hollow cathode magnetron sputter method used in an embodiment of the present invention.

A sample was made in which a magneto-optical recording layer similar to that in Embodiment 6 was formed on a substrate similar to that of Embodiment 6 under operating pressure similar to that in Embodiment 6 with the exception that, in Embodiment 6, instead of the ion beam sputter method, use was made of a method of sputtering the magnetic layer by the hollow cathode magnetron sputter method using a hollow cathode target as shown in FIG. 11, and the dielectric material layer was made by the conventional magnetron sputter method.

When the sample thus made was evaluated by a method similar to that of Embodiment 6, there was found an effect equal to that of Embodiment 6.

[Embodiment 13]

Figure 12:
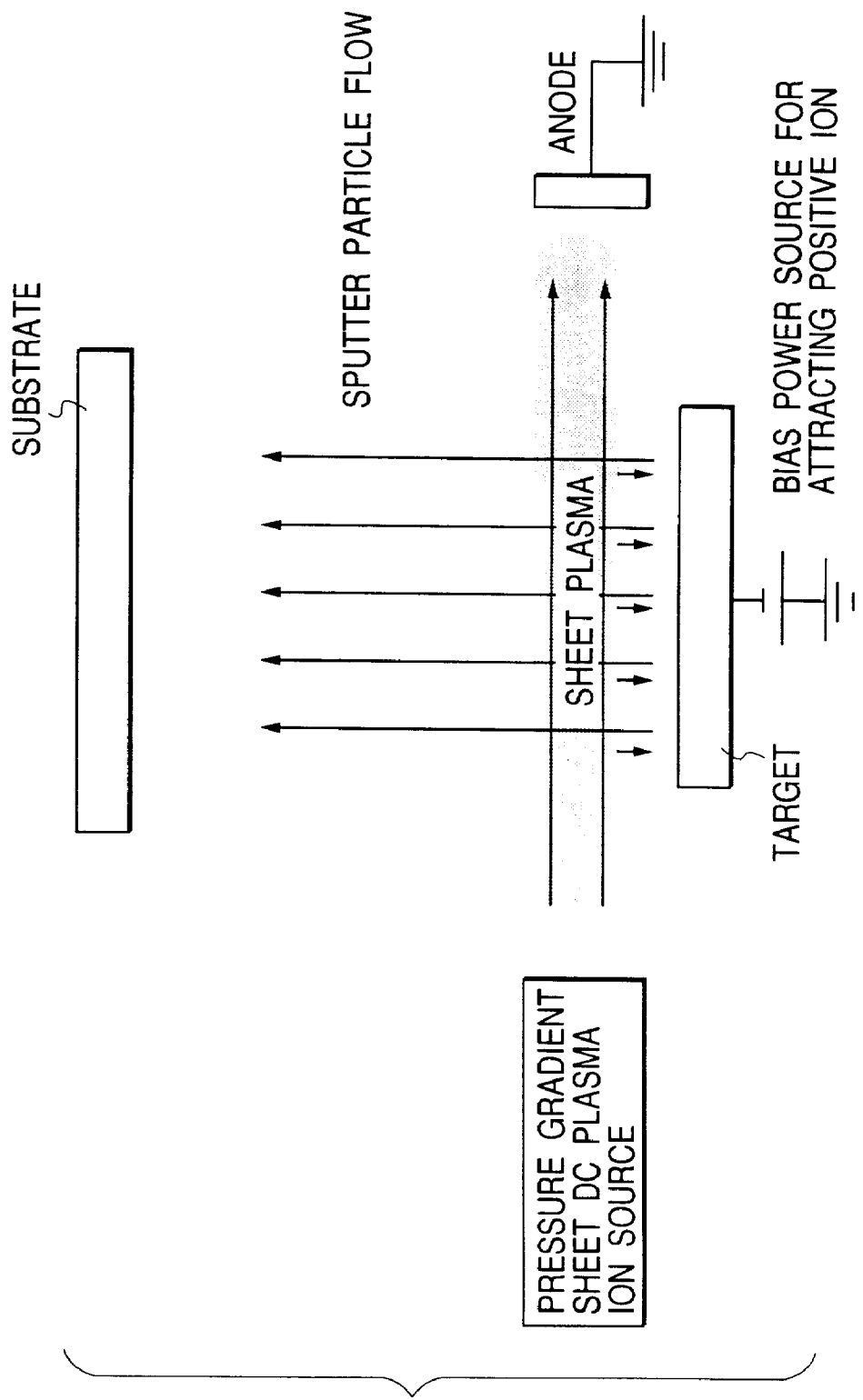
FIG. 12 is a typical view showing a sheet plasma sputter method used in an embodiment of the present invention.
Figure 13:
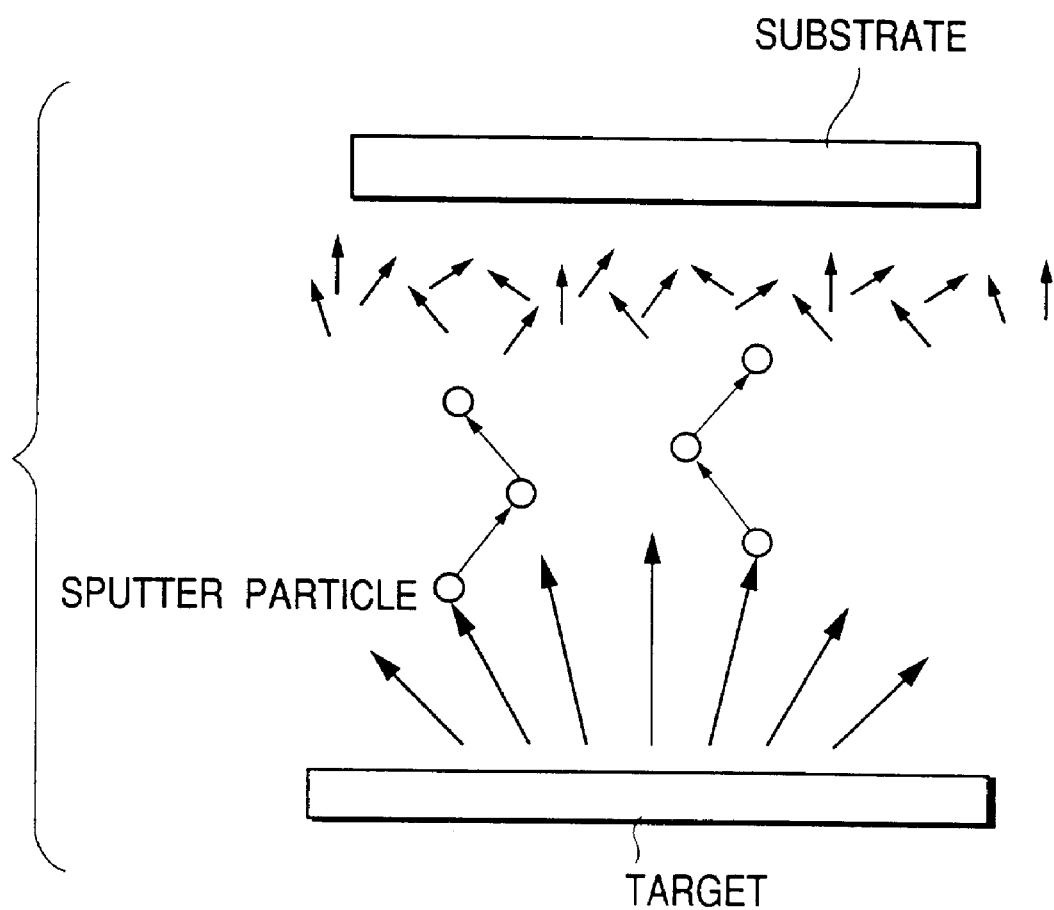
FIG. 13 is a typical view showing the manner of flying of sputter particles in a magnetron sputter method according to the prior art.
Figure 14A:
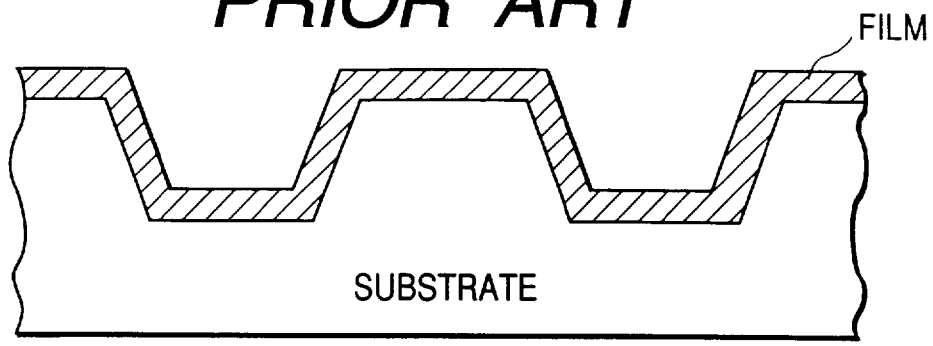
FIGS. 14A, 14B and 14C are typical cross-sectional views showing the manner of adherence of film in an information recording medium having lands and grooves which has been made by the magnetron sputter method according to the prior art.
Figure 14B:
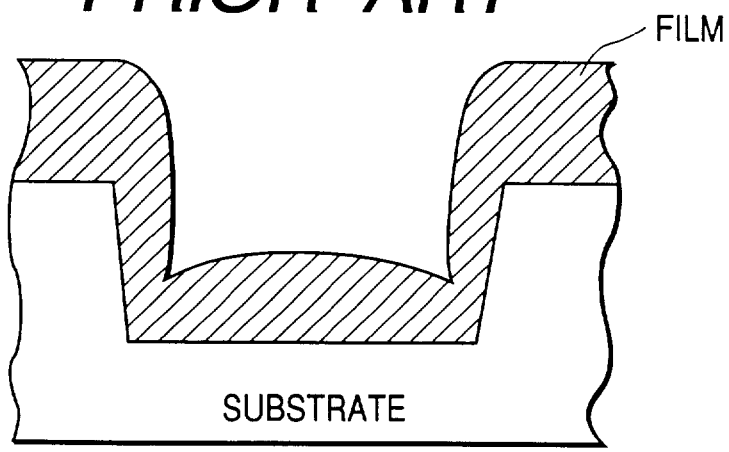
Figure 14C:
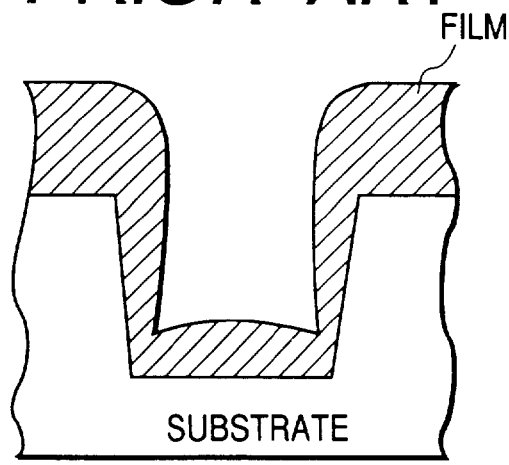

A sample was made in which a magneto-optical recording layer similar to that in Embodiment 6 was formed on a substrate similar to that of Embodiment 6 under operating pressure similar to that in Embodiment 6 with the exception that, in Embodiment 6, instead of the ion beam sputter method, use was made of a sputter method using sheet plasma as shown in FIG. 12.

When the sample thus made was evaluated by a method similar to that of Embodiment 6, there was found an effect equal to that of Embodiment 6. In the sheet plasma generating source, nitrogen gas is used as inert gas such as argon gas or reaction gas for making a nitride. An anode electrode is provided at a location opposed to the plasma source to maintain the sheet plasma stably on a large area.

[Embodiment 14]

A sample was made in which a magneto-optical recording layer similar to that in Embodiment 6 was formed on a substrate similar to that of Embodiment 6 with the exception that, in Embodiment 6, instead of the ion beam sputter method, use was made of a leaf type stationary opposition magnetron sputter method of forming substrates one by one, the distance between the target and the substrate was about 5 cm, and the magnet of the magnetron was made powerful so that the operating pressure might be 0.1 Pa. The mean free path at 0.1 Pa is about 6.7 cm from expression I. When the sample thus made was evaluated by a method similar to that of Embodiment 6, there was found an effect equal to that of Embodiment 6. The stationary opposition referred to so herein refers to the fact that the center of the substrate and the center of the target are on the same axis. However, the substrate may be rotated with its own center as the axis.

[Embodiment 15]

A sample was made in which a magneto-optical recording layer similar to that in Embodiment 6 was formed on a substrate similar to that of Embodiment 6 with the exception that, in Embodiment 6, instead of the ion beam sputter method, use was made of the leaf type stationary opposition magnetron sputter method of forming substrates one by one, the distance between the target and the substrate was about 5 cm and the magnet of the magnetron was made powerful so that the operating pressure might be 0.1 Pa.

When the sample thus made was evaluated by a method similar to that of Embodiment 7, an effect equal to that of Embodiment 6 was found.

As described above, the first effect of the present invention is that, without recording compensation being done by complicated laser driving, a desirable recording mark becomes capable of being formed and a good reproduction characteristic is obtained. Particularly, when mark edge recording is effected, the jitter of a detected edge signal is suppressed and the operating margin is enlarged.

Also, the thermal interference during the operation between tracks is suppressed. As the result, higher density becomes possible. The medium and the recording apparatus also can be made at lower cost.

The second effect of the present invention is that, when the present invention is combined with the magneto-optical recording medium disclosed in Japanese Laid-Open Patent Application No. 6-290496, the magnetic wall of the forward boundary portion of a recording mark and the magnetic wall of the rearward boundary portion of the recording mark can be separately and independently formed by a simple medium manufacturing method and a super-high density reproduction characteristic is improved without any increase in cost.

The third effect of the present invention is being capable of improving the preservability of a micro magnetic domain and providing a medium on which super-high density recording is possible.

The present invention is not restricted to the illustrated mediums. Particularly, the first effect is applicable to any medium on which recording by the heat mode is effected such as a phase change type recording medium or other additional recording type media. The third effect is also applicable to a magnetic recording medium or the like.

What is claimed is:

1. A method for producing an information recording medium comprising the steps of:
   (a) preparing a substrate, wherein the substrate has an information track and slope portions, each slope portion having a face that is not parallel to a face of the information track;
   (b) forming an interference layer on the substrate;
   (c) forming a recording film on the interference layer with a non-isotropic film-forming method so as to form a thickness of the film on the slope portion smaller than that on the information track; and
   (d) etching the recording layer formed on the substrate to remove substantially the recording layer on the slope portions and retain the recording layer on the information track.

2. The method of claim 1, wherein said etching is effected by a reverse sputter method.

* * * * *

UNITED STATES PATENT AND TRADEMARK OFFICE
CERTIFICATE OF CORRECTION

PATENT NO.    : 6,454,915 B1
DATED         : September 24, 2002
INVENTOR(S)   : Tsutomu Shiratori et al.

It is certified that error appears in the above-identified patent and that said Letters Patent is hereby corrected as shown below:

Title page,
Item [45], Date of Patent, "*wx.-99,-9999" should read -- Sept. 24, 2002 --.
Item [56], References Cited, FOREIGN PATENT DOCUMENTS, "01 224 952 A" should read -- 1-224952 A -- and "07 334 869 A" should read -- 7-334869 A --.

Column 1,
Line 25, "and" should read -- and in --.

Column 2,
Line 47, "that" should read -- so that --;
Line 49, "be" should read -- can be --; and
Line 65, "have been" should read -- are --.

Column 3,
Line 9, "as-shown" should read -- as shown --.

Column 6,
Line 52, "6' C." should read -- 6 °C --.

Column 7,
Line 32, "630" should read -- 63° --.

Column 9,
Line 1, "flies" should read -- travels --; and
Line 3, "expanse," should read -- expanding, --.

Column 10,
Line 1, "CF4" should read -- $CF_4$ --.

Column 11,
Line 31, "100° c" should read -- 100 kOe --; and
Line 32, "kOc" should read -- kOe --.

Column 13,
Line 13, "expression I." should read -- expression 1. --.

Column 14,
Line 67, "3000 e," should read -- 300 Oe --.

UNITED STATES PATENT AND TRADEMARK OFFICE
CERTIFICATE OF CORRECTION

PATENT NO. : 6,454,915 B1
DATED : September 24, 2002
INVENTOR(S) : Tsutomu Shiratori et al.

It is certified that error appears in the above-identified patent and that said Letters Patent is hereby corrected as shown below:

Column 15,
Line 42, "ZnS.S10$_2$" should read -- ZnS.SiO$_2$ --.

Column 17,
Line 1, "expression I." should read -- expression 1. --

Signed and Sealed this

Sixth Day of May, 2003

JAMES E. ROGAN
*Director of the United States Patent and Trademark Office*